March 24, 1931.　　　G. W. SILBAUGH　　　1,798,002
BOLT
Filed March 12, 1930
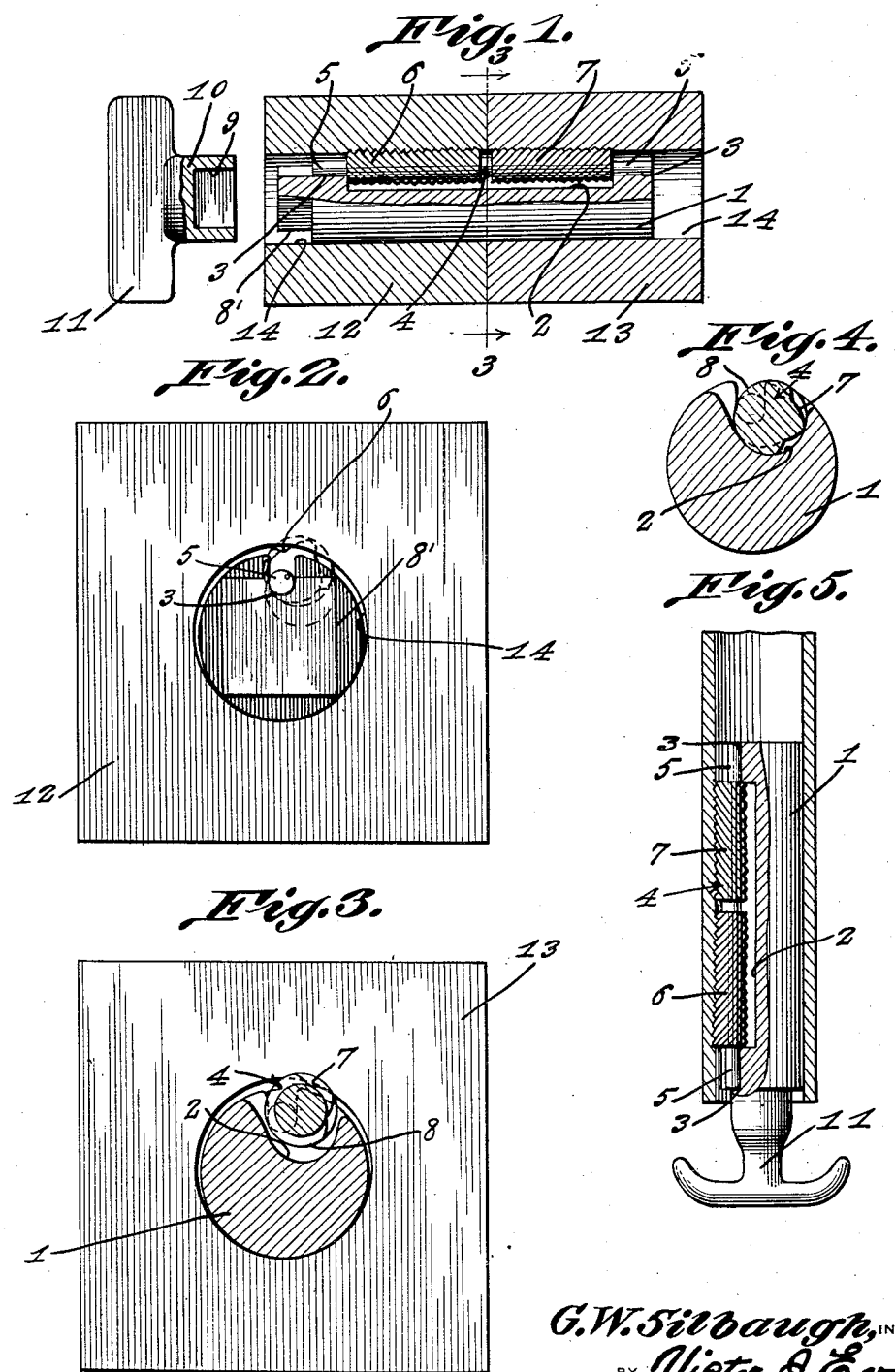
G. W. Silbaugh, INVENTOR
BY Victor J. Evans
ATTORNEY Patented Mar. 24, 1931

1,798,002

UNITED STATES PATENT OFFICE

GEORGE W. SILBAUGH, OF CHARLEROI, PENNSYLVANIA

BOLT

Application filed March 12, 1930. Serial No. 435,350.

This invention relates to new and useful improvements in bolts and more particularly to a device for connecting a pair of members together or for obtaining a grip on any device wherein a bore is formed, such as pipe, cylinders, heads of cylinders and many other devices and has for its primary object the provision of means which may be easily and quickly used to attach a pair of members together or to obtain a grip on a device when lifting or carrying the same.

Another object of this invention is the provision of a connecting member having a ratchet or gripping means adapted to grip and draw a pair of devices together and firmly hold them in such a position when the connecting member is rotated in one direction and to quickly release said object when rotated in an opposite direction, thereby obviating the use of bolts and nuts and other similar fasteners for such work and provide a joining or coupling means, that will efficiently accomplish the desired result in a much quicker and easier way than employing the usual fasteners now customarily employed.

A further object of this invention is the provision of a bolt or connecting member of the above stated character which shall be simple, durable and efficient, and which may be manufactured and sold at a comparatively low cost. With these and other objects in view as will become more apparent as the description proceeds, the invention consists in certain novel features of construction combination and arrangement of parts as will be hereinafter more fully described and claimed.

For a complete understanding of my invention reference is to be had to the following description and accompanying drawing in which:—

Figure 1 is a horizontal sectional view illustrating a bolt or connecting member constructed in accordance with my invention.

Figure 2 is an end elevation illustrating the same.

Figure 3 is a sectional view taken on the line 3—3 of Figure 1.

Figure 4 is a transverse sectional view illustrating the locking element in an inoperative position and Figure 5 is a sectional view illustrating my invention applied in a pipe or like device wherein a cylindrical bore is provided.

Referring in detail to the drawing, the numeral 1 indicates a bolt or connecting member which has a pocket or recess 2 formed in one side thereof and which terminates short of each end of the member 1 to provide bearing portions 3 for the end of a gripping element 4. The bearing portions 3 are grooved to receive trunnions 5 formed eccentrically on the ends of the gripping element 4 so that on rotation of the member 1 with the gripping element in engagement with an object will cause said gripping element to swing outwardly of the recess 2 towards the object and wedge between the object and the member 1 and when the latter is rotated in an opposite direction will cause the gripping element 4 to swing into the recess 2 to free the gripping element 4 from the object. The gripping element 4 has formed thereon spirally arranged teeth or ribs 6 and 7 and they extend in opposite directions to each other as clearly shown in Figure 1 of the drawings, that is the ribs or teeth 6 extend from one end of the gripping element 4 towards its intermerdiate portion while the teeth or ribs 7 extend from the other end of the gripping element 4 towards its intermediate portion. The ribs or teeth 6 and 7 do not extend entirely around the gripping element 4 and thereby provided a smooth face 8 to the gripping element 4 which is adapted to be disposed outermost of the recess 2 when the device or gripping element 4 is in an inoperative position thereby permitting the connecting member 1 to be easily placed into and removed from the bore of an object. One end of the connecting member 1 is reduced and provided with rectangular faces 8′ adapted to be received within the rectangular shaped socket 9 of a shank 10 forming a part of an operating tool. The tool is provided with a suitable head or finger grip 11 formed on the shank 10 so that the connecting member may be rotated in either direction when desired.

In operation, when it is desired to connect a pair of members 12 and 13 as shown in Figure 1 and which are provided with cylindrical bores 14, the handle is applied to the end of the connecting member and the latter is positioned within the bores of the members 12 and 13 as shown in Figure 1 and by rotating the member 1 in a clock-wise direction the gripping element 4 by having frictional contact with the walls of the bores will swing outwardly of the recess 2 causing the ribs or teeth 6 and 7 to bite into the walls of the bores and thereby firmly lock or secure the objects 12 and 13 together. The rotation of the connecting member 1 in an anti-clockwise direction will cause the gripping element 4 to swing inwardly of the recess and dispose the smooth face of the element 1 outwardly of the recess and thereby free the objects 12 and 13 to permit them to be separated when desired. The ribs or teeth 6 and 7 may be made extremely sharp when desiring to use the device to connect objects or devices constructed of metal or similar material.

When it is desired to lift, pull or carry an object by the connecting member the handle 11 is firmly secured to the connecting member 1 in any desired manner and the connecting member is inserted in the device as shown in Figure 5 and turned in a clock-wise direction causing the gripping element to firmly wedge the member 1 in the object so that the device may be easily handled.

If desired the handle 11 or its shank 10 thereof may be constructed of any desired length so that the device can be used for removing tubular members or objects from inaccessible places and if desired the connecting member 1 may be provided with a plurality of gripping elements 4 by simply increasing the number of recesses 2, bearing portions 3 and gripping elements 4.

While I have shown and described the preferred embodiment of my invention, it will be understood that minor changes in connection, combination and arrangement of parts may be made without departing from the spirit and scope of the invention as claimed.

Having thus described my invention, what I claim is:

A device of the character set forth comprising a cylindrical member to be positioned in the bore of an object and having a recess terminating short of each end to provide bearing portions at the ends of the member, a substantially cylindrical locking member in the recess, trunnions eccentrically formed on the ends of the locking member and received by the bearing portions to eccentrically mount the said locking member for movement wholly within the recess when in one position and to dispose a portion of the periphery of said locking member outwardly of the recess and in tight engagement with the wall of the bore of the object when in another position, groups of spiral teeth on the last named portion of the periphery of said locking member and the teeth of one group extending in an opposite direction from the teeth of the other group, and tool engaging faces at one end of the locking member.

In testimony whereof I affix my signature.

GEORGE W. SILBAUGH.